United States Patent [19]

Johnson

[11] 4,185,616
[45] Jan. 29, 1980

[54] SOLAR ENERGY ABSORBER APPARATUS AND METHOD

[76] Inventor: Steven A. Johnson, 136 North 1st West, Preston, Id. 83263

[21] Appl. No.: 711,334

[22] Filed: Aug. 3, 1976

[51] Int. Cl.$^2$ .................................................. F24J 3/02
[52] U.S. Cl. ..................... 126/443; 126/444; 126/446
[58] Field of Search .............. 126/270, 271; 237/1 A; 52/18, 80, 200

[56] References Cited

U.S. PATENT DOCUMENTS

| | | | |
|---|---|---|---|
| 2,918,023 | 12/1959 | Bettcher | 126/270 X |
| 2,918,023 | 12/1959 | Bettcher | 126/270 X |
| 3,174,915 | 3/1965 | Edlin | 126/271 X |
| 3,916,871 | 11/1975 | Estes et al. | 126/271 |
| 3,916,871 | 11/1975 | Estes et al. | 126/271 |
| 3,965,683 | 6/1976 | Dix | 126/271 X |
| 3,974,822 | 8/1976 | Patil | 126/271 |
| 3,981,293 | 9/1976 | Gillery | 126/271 |
| 3,987,783 | 10/1976 | Powell | 126/271 |
| 4,010,080 | 3/1977 | Tsay et al. | 126/271 |
| 4,015,586 | 4/1977 | Vroom et al. | 126/271 |
| 4,055,163 | 10/1977 | Costello et al. | 126/271 |
| 4,056,093 | 11/1977 | Barger | 126/271 |
| 4,081,289 | 3/1978 | Cambell | 126/270 X |
| 4,094,301 | 6/1978 | Sorenson et al. | 126/270 X |

*Primary Examiner*—Samuel Scott
*Assistant Examiner*—Larry Jones
*Attorney, Agent, or Firm*—J. Winslow Young; H. Ross Workman; Rick D. Nydegger

[57] ABSTRACT

An improved apparatus and method for absorbing solar energy, the apparatus providing a sealed envelope having a transparent upper panel with a solar energy absorbing panel thermally isolated against convective and conductive heat losses by a partial vacuum in the sealed envelope. The transparent panel has an upwardly extending curvilinear surface which increases its strength characteristics against the pressure differential between the ambient and the partial vacuum inside the envelope. Support structure is also provided in conjunction with the apparatus to place the periphery of the transparent panel under constriction to compensate for tensile stresses imposed thereon by the pressure differential. The inside surface of the transparent panel and the absorber panel are selectively coated with an infrared reflective surface to reflect and reduce losses of infrared radiation emitted by the absorber panel.

11 Claims, 5 Drawing Figures

SOLAR ENERGY ABSORBER APPARATUS AND METHOD

BACKGROUND

1. Field of the Invention

This invention relates to solar energy absorbing apparatus and more particularly to an improved apparatus and method for absorbing solar energy in a fluid while minimizing heat losses therefrom.

2. The Prior Art

Recent adverse events in the field of energy, particularly those events related to fossil fuels (i.e., petroleum and coal resources) has focused attention on the possibility of utilizing solar energy as an energy source. Solar energy is clean and, in many parts of the world, abundantly available during daylight hours.

Conventional solar energy collectors involve large absorbing panels through which a fluid is passed. However, these devices are, historically, relatively inefficient since a large percentage of the solar energy initially absorbed by the fluid is lost through conduction, convection, and reradiation to the surrounding ambient. Attempts to minimize these losses by enclosing the absorber panel in a sealed envelope with a transparent upper panel and under a partial vacuum have proven difficult since the pressure differential between the atmospheric pressure of the surrounding ambient and the partial vacuum creates excessive tensile stresses in the periphery of the transparent panel resulting in fracture of the same. Attempts to overcome this problem by increasing the thickness of the transparent panel results in a corresponding increase in the weight, cost, and solar energy absorption characteristics of the transparent panel portion of the apparatus thereby offsetting most gains obtained by the use of a partial vacuum.

It would, therefore, be an advancement in the art to provide an apparatus and method for increasing the structural integrity of the transparent upper panel for an envelope in which a solar energy absorbing panel is isolated under partial vacuum while minimizing the conductive, convective and radiation heat losses from the absorber panel. Advantageously, it would be an advancement in the art to impart a constrictive force to the periphery of the upper, transparent panel to compensate for the tensile forces imposed by the pressure differential created by the internal vacuum in the envelope. It would be an even further advancement to utilize the stresses imposed by the pressure differential between the internal partial vacuum and the external atmospheric pressure to impose a constrictive force to the periphery of the transparent panel to thereby compensate for the tensile stresses therein. Such an apparatus and method is disclosed herein.

BRIEF SUMMARY AND OBJECTS OF THE INVENTION

The present invention is an apparatus and method for absorbing solar energy while reducing convective, conductive and radiation heat losses from the absorber panel. An absorber panel is isolated under partial vacuum in a sealed envelope having a transparent upper panel. Radiation heat losses from the absorber panel are reduced by coating its surface and the inside surface of the transparent panel with a coating which is reflective to infrared radiation. Such a coating is referred to in the trade as a selective black surface and selectively absorbs/reflects infrared radiation.

Structural integrity of the transparent panel is improved by forming the transparent panel with an upwardly curvilinear upper surface and including structure for imposing a constrictive force around the periphery of the transparent panel so as to overcome tensile forces in the periphery.

It is therefore an object of this invention to provide improvements in the method for collecting solar energy.

Another object of this invention is to provide improvements in apparatus for collecting solar energy.

Another object of this invention is to provide an apparatus wherein conductive, convective and radiation heat losses from a solar energy absorbing panel are reduced.

Another object of this invention is to provide an improved solar energy absorbing apparatus wherein means are provided for isolating a solar energy absorbing panel in a partial vacuum against conductive and convective heat losses.

An even still further object of this invention is to provide an apparatus for imposing a constrictive force around the periphery of a transparent panel thereby overcoming excessive tensile stress which would otherwise tend to fracture the transparent panel.

These and other objects and features of the present invention will become more fully apparent from the following description and appended claims taken in conjunction with the accompanying drawing.

DETAILED DESCRIPTION OF THE PREFERRED EMBODIMENTS

Figure 1:
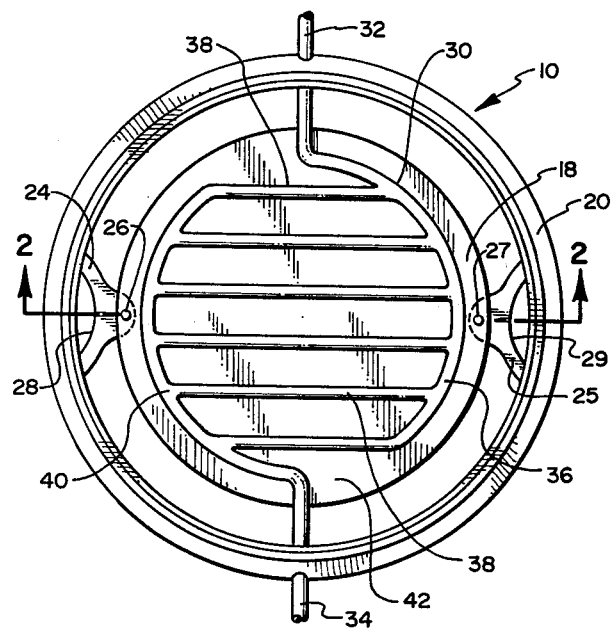
FIG. 1 is a plan view of one presently preferred embodiment of the solar collector apparatus of this invention.

The invention is best understood by reference to the figures wherein like parts are designated with like numerals throughout.

General

Glass or other suitable rigid, transparent sheet material such as plastic, or the like, is well known to have a greater strength under compression than tension. Accordingly, a sheet of glass will fracture when forces are placed on the sheet which exceed the tensile strength of the material. This particularly occurs when an excessive force is imposed perpendicular to the plane of a flat sheet of glass and results in the tensile strength of the material being exceeded at the opposite side of the sheet of glass. However, increased strength can be obtained from glass sheets formed into curvilinear surfaces. Compressive forces acting toward the epicenter of the curvilinear surface tend to place most of the body of the glass structure under compression. However, compression of the curvilinear surface toward its epicenter results in forces which radiate outwardly and tend to spread or stretch the periphery of the curvilinear surface to compensate for the flattening tendency of the curvilinear surface. These spreading or stretching forces place the periphery or hoop of the curvilinear surface under tension. This tension is known as the hoop tension of the curvilinear structure.

Several mathematical formulas for calculating the hoop tension forces in sections of right circular cylinders and sections of spherical surfaces under differential hydrostatic pressures have been developed. The hoop tension in a right circular cylinder is given by the formula of Equation 1:

$$T = P_o R / t \qquad \text{Equation 1}$$

where T is the tension as measured in units of force per unit area; R is the radius of the circular section of the cylinder; t is the thickness for a thin-walled cylinder; and $P_o$ is the hydrostatic pressure differential across the surface of the cylinder. It will be noted that this mathematical derivation applies to a length of cylinder.

The hoop tension from stresses imposed on a segment of a spherical surface is given by Equation 2:

$$T = P_o R / (2t) \qquad \text{Equation 2}$$

where $P_o$ is the difference in hydrostatic pressure across the sphere; R is the radius of the sphere; and t is the thickness of the thin spherical surface. In both equation 1 and equation 2, the stress is compressive if the hydrostatic pressure is greater outside than inside the curved surface.

A mathematical formula will now be given which will describe the conditions necessary to balance the stresses for two concentric right cylinders and, correspondingly, two concentric spherical surfaces. It will be shown that if a partial vacuum is present between the two sealed concentric right cylinders or two concentric spherical surfaces, which are constrained by a force tangent to the edge of the surface and surrounded by an atmospheric pressure, that the inner surface is under tension while the outer surface is under compression. It will be further shown that under certain conditions the compression on the outer surface may be made to compensate for the tension on the inner surface so that the restraints at the edges may be removed without danger of the outer, transparent cover breaking from tension or excessive compression. The condition for, as derived from Equation 1, is given by Equation 3:

$$4R_1^2 - W_1^2 = 4R_2^2 - W_2^2 \qquad \text{Equation 3}$$

where $R_1$ is the radius of the inner cylindrical surface; $W_1$ is the length of the chord for the inner cylindrical surface; $R_2$ is the radius of the outer cylindrical surface and $W_2$ is the chord of the outer cylindrical surface. In this particular comparison, the edges of the cylindrical surfaces and, correspondingly, the chords thereof, lie in the same plane. Additionally, the edges of the cylindrical surfaces are restrained against movement by forces tangent to the cylindrical surface. When the equilibrium conditions of Equation 3 are met, the outer surface is under compression while the inner surface is under tension.

This same mathematical formula (Equation 3) can also be applied to two concentric spherical surfaces wherein $R_2$ is the radius of the outer spherical surface; $R_1$ is the radius of the inner spherical surface; $W_2$ is the diameter of the circle defined by the periphery of the outer spherical surface; and $W_1$ is the diameter of the circle defined by the periphery of the inner spherical surface, both circles lying in the same plane. Additionally, the edges represented by those circles are restrained against movement by forces tangent to the spherical surface. For the case of two concentric spherical surfaces the condition for equilibrium is $R_1 = R_2$.

Accordingly, since the foregoing Equation 3 and its counterpart equations illustrates that cylindrical and spherical curvilinear surfaces may be placed in compression, it follows that cylinders or domes having eliptical, oval, rectangular, polygonal peripheries can, in like manner, be placed in compression.

THE EMBODIMENT OF FIGS. 1 AND 2

Figure 2:
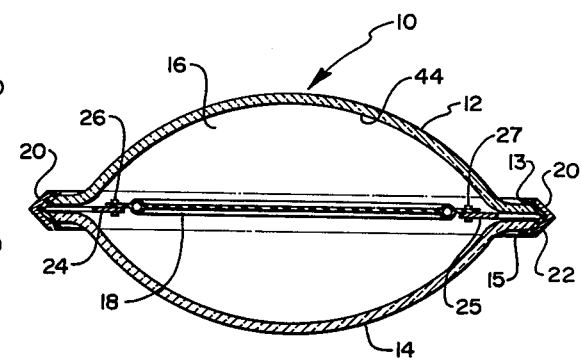
FIG. 2 is a cross section taken along lines 2—2 of FIG. 1.

Referring now more particularly to FIGS. 1 and 2, a first preferred embodiment of a solar collector apparatus of this invention is shown generally at 10 and includes an upper, transparent panel 12 and a lower, support pan 14. Transparent panel 12 and support pan 14 are formed as complementary curvilinear surfaces with dimensionally corresponding peripheries 13 and 15, respectively. Each curvilinear surface is configurated as a segment of a spherical surface and are joined together along peripheries 13 and 15 to create an envelope 16.

Transparent panel 12 is fabricated from any suitable, rigid, transparent material such as glass, plastic or the like, which will transmit solar radiation. Importantly, in order to lower weight and cost while providing for increased transmission of solar radiation, transparent panel 12 is fabricated from relatively thin transparent material. Accordingly, in order to withstand a pressure differential between the ambient and a partial vacuum in envelope 16, as will be discussed more fully hereinafter, transparent panel 12 is formed with an outwardly curvilinear or dome shape. This dome shape causes the greater ambient pressure outside of envelope 16 to place the dome of transparent panel 12 under compression. However, periphery 13 is placed under tension when the dome of transparent panel 12 is under such compression. Surprisingly, constriction of periphery 13 tends to compensate for the tension thereon and significantly improves the strength characteristics of transparent panel 12 even though transparent panel 12 is fabricated from relatively thin transparent material.

Support pan 14 is not necessarily fabricated from a transparent material but may be fabricated from a thin sheet of any suitable metallic or plastic material having the necessary strength characteristics in order to be able to support the partial vacuum in envelope 16. Accordingly, support pan 14 is also configurated with an outwardly curvilinear surface in order to be able to withstand the pressure differential between the partial vacuum in envelope 16 and the atmospheric pressure of the ambient.

In the particular illustrated embodiment of FIGS. 1 and 2, peripheral edges 13 and 15 are sealed by a seal 22 configurated as a band of elastomeric material which is placed over the joined edges of peripheries 13 and 15. A constriction ring 20 has a chevron-like cross section and, when placed against seal 22, forces seal 22 against peripheries 13 and 15 while, simultaneously, forcing peripheries 13 and 15 together. Constriction ring 20 is thereby configurated as a tension band and may be tensioned by any suitable conventional devices such as a screw clamp or the like. In this manner, constriction ring 20 imparts the necessary constrictive force to periphery 13 of transparent panel 12 so as to compensate for tension forces which would exceed the tensile strength of the material of transparent panel 12.

Envelope 16 is particularly adapted to be partially evacuated by conventional means so as to isolate an absorber panel 18 therein from convective and conductive heat losses to the surrounding ambient. It is this partial vacuum in envelope 16 which results in the pressure differential across transparent panel 12 and the need for increasing the strength characteristics of the same by applying the constrictive force to periphery 13 by constriction ring 20. Radiation heat losses from absorber panel 18 are reduced by reflective coating 44 which is configurated as a reflective coating specifically formulated to reflect infrared radiation and is applied to the internal surface of transparent panel 12 and support pan 14. Reflective coating 44 reflects infrared radiation emitted from absorber panel 18 back to absorber panel 18 where it is reabsorbed thereby. Radiation losses are also minimized by use of a selective black surface (well known in the art) on absorber 18.

Absorber panel 18 is suspended in envelope 16 by means of flanges 24 and 25 which are secured to opposing edges of absorber panel 18 by rivets 26 and 27. The opposite ends of flanges 24 and 25 are clamped between peripheries 13 and 15 to thereby suspend absorber panel 18 in the desired position at the mid section of envelope 16. It will be particularly noted that each of flanges 24 and 25 are relatively thin and include a cutout portion 28 and 29, respectively, so as to minimize the cross-sectional area of material available to conduct thermal energy away from absorber panel 18. Additionally, cutouts 28 and 29 adapt each of flanges 24 and 25, respectively, as a wider brace and thereby provide greater stability to absorber panel 18.

Absorber panel 18 includes fluid channel 30 having an inlet 32 and an outlet 34. Inlet 32 admits a fluid (not shown) into an inlet manifold 36 which distributes the fluid to a plurality of absorber conduits 38. Conduits 38 drain into an outlet manifold 40 in direct fluid communication with outlet 34. The fluid may be any suitable heat exchange fluid such as water, air, ethylene glycol, or the like.

Each of inlet 32 and outlet 34 communicate through the sealed envelope 16 by passing between peripheral edges 13 and 15 and through seal 22 and retaining ring 20. Suitable seals (not shown) are provided around inlet 32 and outlet 34 so as to permit the maintenance of the partial vacuum in envelope 16.

Absorber panel 18 includes an absorber surface 42 which is configurated as a circular disc and is diametrally reduced so as to isolate absorber surface 42 from peripheries 13 and 15. Absorber surface 42 is integrally bonded to fluid channel 30, inlet manifold 36, absorber conduits 38, and outlet manifold 40. The function of the intimate combination between absorber surface 42 and the structure of fluid channel 30 is to enhance absorption of solar energy striking absorber surface 42 and transmission of the same through conduction to the fluid passing through fluid channel 30. Clearly, absorber surface 42 could readily be configurated as the upper wall structure of fluid channel 30 with fluid channel 30 being configurated as a circular disc through which the fluid passes. However, it is presently believed that the illustrated configuration including inlet manifold 36, absorber conduits 38, and outlet manifold 40, provides an optimum distribution of the fluid throughout the surface area of absorber surface 42.

Accordingly, solar collector 10 may be inexpensively fabricated as an integral unit and thereafter, envelope 16, evacuated. As such, the solar collector panel 10 is readily adapted to a number of solar collecting structures and requires only that suitable fluid connections be made to inlet 32 and outlet 34 for the efficient collection of solar energy.

THE EMBODIMENT OF FIGURE 3

Figure 3:
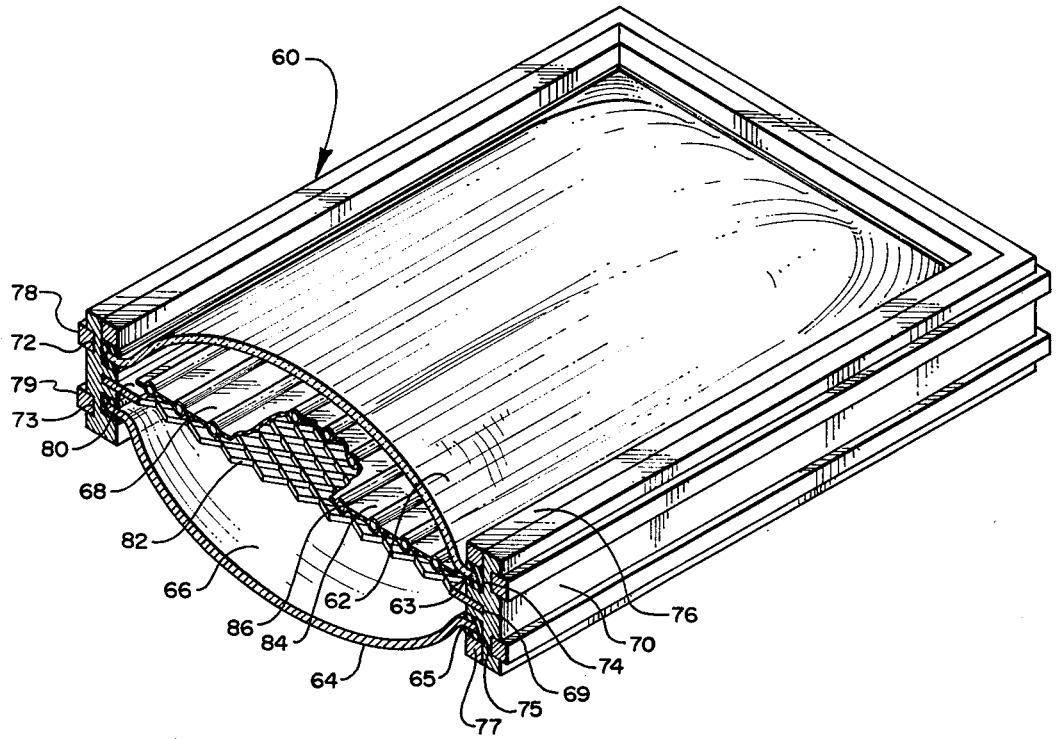
FIG. 3 is a perspective view of a second preferred embodiment of the solar collector apparatus of this invention with portions broken away to reveal internal features.

Referring now more particularly to FIG. 3, a second preferred embodiment of a solar collector apparatus of this invention is shown generally at 60 and includes an upper, transparent panel 62 and a support pan 64. Transparent panel 62 is generally configurated as a right cylindrical surface which tapers outwardly to a rectangular periphery 63.

Transparent panel 62 is configurated with an outwardly curvilinear surface for the reasons set forth hereinbefore with respect to transparent panel 12 (FIGS. 1 and 2) so that the necessary strength characteristics can be imparted to transparent panel 62 while simultaneously reducing weight, cost and solar radiation absorption by transparent panel 62.

Support pan 64 has a configuration which complements transparent panel 62 and presents a rectangular periphery 65 which dimensionally corresponds with periphery 62. In the illustrated embodiment of FIG. 3, support pan 64 is fabricated from transparent material similar to transparent panel 62. Accordingly, solar collector 60 may be readily inverted so as to permit the transmission of solar radiation through support pan 64 into contact with an absorber panel 68. In either configuration, transparent panel 62 and support pan 64 provide a sealed envelope 66 so as to isolate absorber panel 68 therein from conductive and convective heat losses. Additionally, the internal surfaces of transparent panel 62 and support pan 66 are selectively coated with a suitable reflective material so as to reflect infrared radiation to absorber panel 68 and thereby reduce radiation heat losses from absorber panel 68. Absorber panel 68 is also constructed with a selective black coating to reduce radiation heat losses.

Additionally, solar collector 60 may be configurated as an insulative window by omitting solar absorber panel 68 or as a skylight/solar energy collector apparatus by fabricating absorber panel 68 from commercially available transparent or translucent materials. As a window, envelope 66 would remain as a sealed, evacuated envelope so as to provide an insulative barrier against conductive and convective heat losses. Additionally, the inside surfaces of envelope 66 could be selectively coated with a coating having a high reflectivity for infrared radiation to, selectively, direct the infrared radiation out of or into the structure in which it is placed, depending upon the need to heat or insulate the structure.

As a skylight, absorber panel 68 would be selectively coated with a conventional coating having a high degree of absorptivity for the longer wavelengths of electromagnetic radiation or infrared/thermal radiation while, simultaneously, allowing most of the shorter wavelengths or visible light to pass therethrough.

The combined peripheries 63 and 65 are encompassed by support collar 70 which receives each of peripheries 63 and 65 in sealing relationship. Periphery 63 is embedded in an upper seal 74 while periphery 65 is embedded in a lower seal 75. Upper seal 74 is confined to support collar 70 by an upper retaining frame 76 while lower seal 75 is retained in support collar 70 by a lower retaining frame 77.

Support collar 70 includes an upper groove 72 and a lower groove 73 which receive an upper compression band 78 and a lower compression band 79, respectively. It should be particularly noted that each of compression bands 78 and 79 are opposite peripheries 63 and 65, respectively. Compression bands 78 and 79 cooperate in support collar 70 and are tightened by a conventional device such as a screw clamp to impose a constrictive force about the peripheries 63 and 65, respectively. This compressive force tends to compensate for tensile stresses which develop in peripheries 63 and 65 as a result of the pressure differential developed between the atmospheric pressure of the ambient and the partial vacuum developed in envelope 66.

Support collar 70 includes a centrally located groove 69 which traverses the internal face of support collar 70. Groove 69 is used to clamp flange 80 of a grid 82 and securely engage the same. Grid 82 is fabricated from relatively thin stock material so as to reduce the cross-sectional area of the material available for conduction of heat away from absorber panel 68. Grid 82 is supported by a solid peripheral edge or flange 80 which is engaged by support collar 70. Grid 82 functions to thereby support absorber panel 68 while minimizing conductive heat losses from the same. Although grid 82 is shown in contact with panel 68 this is not necessary and further thermal isolation is possible by supporting panel 68 at a few points with insulating supports. Grid 82 is engaged by support collar 70 and placed under tension so as to pull the support collar 70 inwardly thereby placing peripheries 63 and 65 under a constrictive force. This may be done either singly or in combination with the constrictive action of compression bands 78 and 79.

Solar energy absorber panel 68 is fabricated from an absorber surface 84 in intimate thermal contact with a plurality of fluid conduits 86. The fluid in conduits 86 is used to absorb and carry away the thermal energy developed by the solar energy absorbed by absorber panel 68. The fluid in conduits 86 flows through the structure of solar collector 60 from an inlet (not shown) through an inlet manifold (not shown) and is thereafter collected by an outlet manifold (not shown) and thereafter conducted to an outlet (not shown). The inlet, inlet manifold, outlet manifold, and outlet are not shown here in FIG. 3 since substantially similar features with respect to this apparatus are conventional and are also described and set forth with respect to FIGS. 1 and 2, hereinabove.

Figure 4:
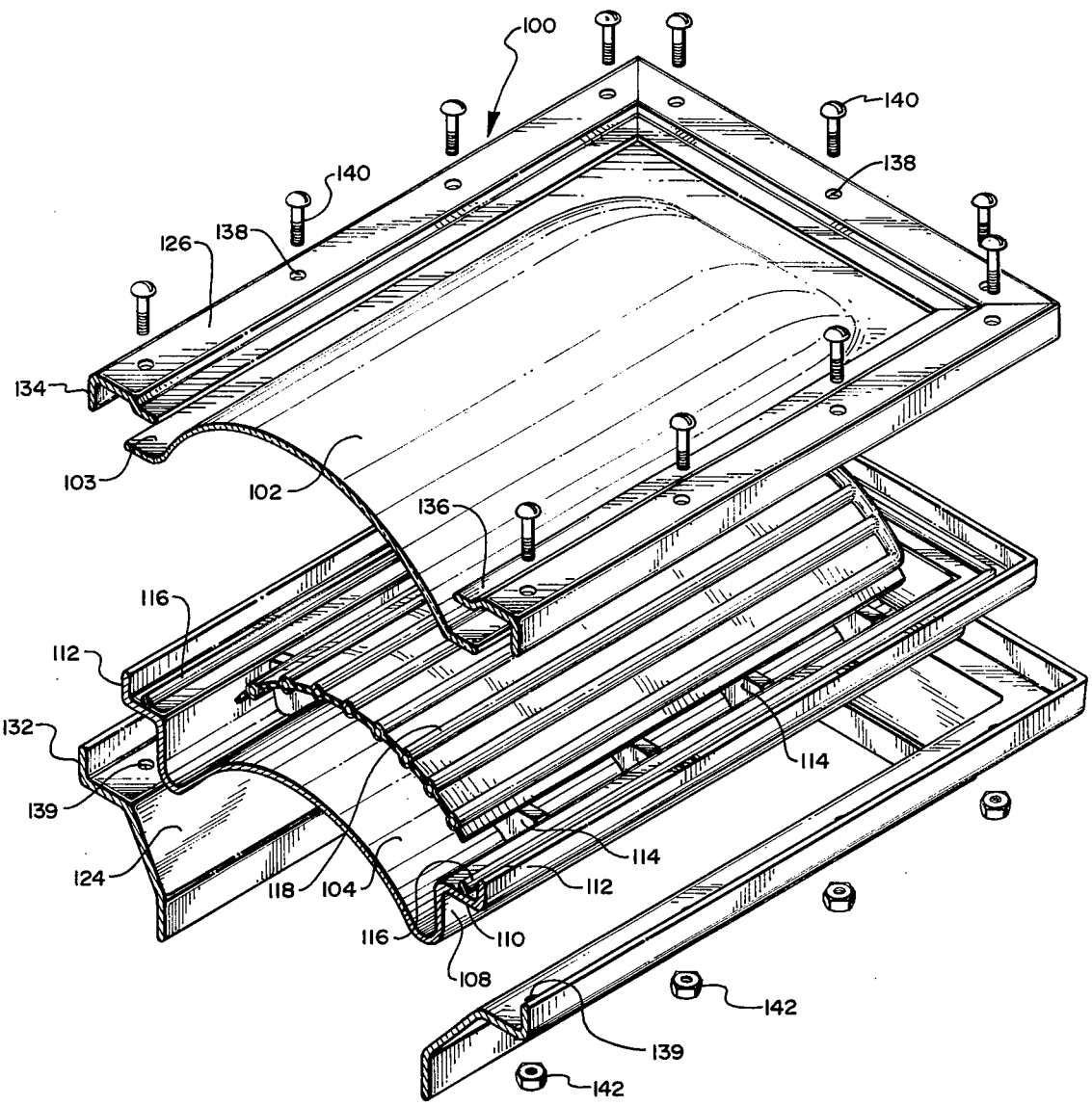
FIG. 4 is a fragmentary exploded perspective view of a third preferred embodiment of the solar collector apparatus of this invention to reveal the internal components thereof.
Figure 5:
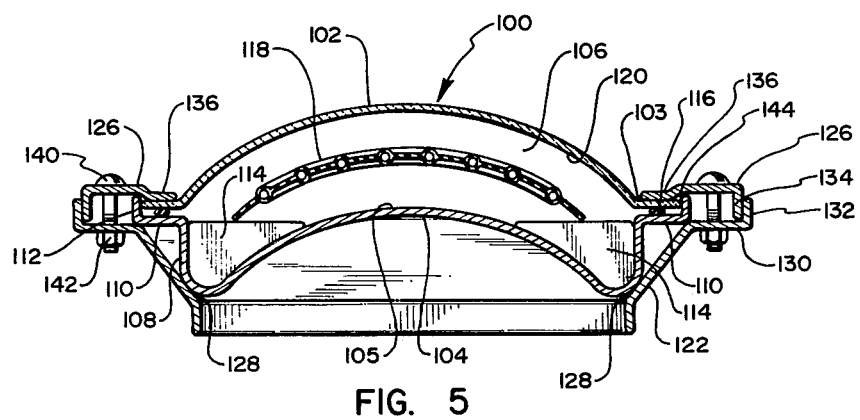
FIG. 5 is a cross section of the assembled apparatus of FIG. 4.

THE EMBODIMENT OF FIGS. 4 and 5

Referring now more particularly to FIGS. 4 and 5, a solar collector is shown generally at 100 and includes an upper, transparent panel 102 which is sealed against a support pan 104 to create a sealed envelope 106 therebetween. In this particular embodiment, transparent panel 102 is configurated substantially similar to transparent panel 62 (FIG. 3) and has a rectangular periphery 103. Clearly, however, the illustrated embodiment of FIGS. 4 and 5 could also be configurated as a circular solar collector apparatus generally similar to solar collector 10 (FIG. 1).

Support pan 104 is configurated with a corresponding, upwardly curvilinear surface 105 which is upwardly directed for the purpose to be discussed more fully hereinafter. Support pan 104 is turned upwardly along its lower periphery of the arcuate surface to form a vertical wall 108. Wall 108 is bent outwardly along its top edge to form a shelf 110 and shelf 110 is thereafter bent upwardly to form a flange 112. Flange 112 is configurated to dimensionally correspond to periphery 103 of transparent panel 102 so as to closely circumscribe periphery 103. Accordingly, flange 112 constricts periphery 103 when a partial vacuum is developed in envelope 106 as will be discussed more fully hereinafter. Importantly, the external dimensions of periphery 103 are suitably prepared so as to match the internal dimensions of the rectangular configuration formed by flange 112 along a contact line 144.

The channel created between the curvilinear surface 105 of support pan 104 and wall 108 has a plurality of support gussetts 114 spot-welded therein for the purpose of providing increased strength between the curvilinear surface 105 of support pan 104 and vertical wall 108. Additionally, gussetts 114 act as spaced supports for an absorber panel 118 placed in envelope 106. Absorber panel 118 is functionally similar to absorber panel 68 (FIG. 3) with the exception that absorber panel 118 is formed as a section of cylindrical surface with the edges resting on gussetts 114.

The overall structural integrity of solar collector 100 is maintained by a framework 122. Framework 122 includes a frame 126 in cooperation with a lower rectangular housing 124. Housing 124 is configurated to encircle support pan 104 and lend structural integrity thereto. Support pan 104 is spot-welded to housing 124 by a plurality of spot welds 128. From spot welds 128, housing 124 slants upwardly and outwardly to a support 130 which acts as a support for shelf 110 of support pan 104. Support 130 terminates in an upwardly extending ridge 132 which defines the outermost periphery of solar collector 100. Where determined necessary, housing 124 can be provided with additional strength and stability by inserting appropriate bracing structure in the open spaces below support pan 104 and within the confines of housing 124.

Frame 126 nests within the confines defined by ridge 132 and includes a peripheral, downwardly depending lip 134 which cooperates interiorly with ridge 132. Frame 126 also includes a downwardly directed platform 136. Platform 136 is configurated to press against periphery 103 of transparent panel 102. Periphery 103 is sealed to support pan 104 by an O-ring 116 fabricated from a suitable elastomeric material and placed between periphery 103 and shelf 110. Frame 126 includes a plurality of apertures 138 which are in registry with a corresponding plurality of apertures 139 in support 130 of housing 124. Bolts 140 cooperate through apertures 138 and 139 and are secured by nuts 142 and thereby compress O-ring 116 between periphery 103 and shelf 110.

Sealed envelope 106 is evacuated by conventional means to form a partial vacuum therein. Accordingly, with envelope 106 suitably evacuated with a partial vacuum, absorber panel 118 is thermally isolated against conductive and convective heat losses. Radiation heat losses are reduced by a suitable reflective coating 120 which is applied to the internal surfaces of transparent panel 102 and support pan 104 to thereby selectively reflect infrared radiation emitted by absorber panel 118 back to absorber panel 118. Additionally, absorber panel 118 is coated with a selective black surface to enhance the absorptivity of absorber panel 118 while lowering its emissivity, particularly, of the longer wavelength electromagnetic radiation or far infrared or thermal region. These features are similar to those set forth hereinbefore with respect to the embodiments of FIGS. 1 and 2 and FIG. 3.

The pressure differential and the greater pressure of the atmospheric pressure of the surrounding ambient compresses envelope 106 so that periphery 103 is placed under tension while the upward force on support pan 104 causes flange 112 to contract inwardly to constrict periphery 103 along contact line 144. This constrictive force tends to compensate for tensile forces in periphery 103. Accordingly, the structure of solar collector 100 functions as a self-stressing design by utilizing the forces imposed upon envelope 106 to compensate for tension forces imposed on periphery 103. Solar collector 100 is thereby self-stressed so that the compressive bands and retaining rings of the apparatus of FIGS. 1 and 2 and FIG. 3 are eliminated. Importantly, support pan 104 is fabricated from metal or other high tensile-strength material so as to have the necessary strength characteristics to be able to impart a constrictive force to flange 112.

In each of the foregoing embodiments illustrated herein, a constrictive force is imposed on the periphery of the respective transparent panels so as to compensate for tensile forces which would otherwise fracture the transparent panel. Accordingly, the respective transparent panel may be fabricated from a relatively thin transparent material so as to (1) reduce weight, (2) lower manufacturing costs, and (3) reduce material available for absorption of solar radiation passing through the transparent panel. This is possible only by reason of the transparent panel being fabricated from relatively thin material and configured with an upwardly curvilinear surface so that the majority of the curvilinear surface is under compression with the exception of the periphery. The periphery is, therefore, suitably constricted to compensate for tensile stresses which would otherwise fracture the respective transparent panel.

The invention may be embodied in other specific forms without depending from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for absorbing solar energy comprising:
    an upper panel fabricated from a transparent material and configured with an upwardly-curved curvilinear surface, the panel having a planar periphery;
    a lower panel configured with a curvilinear surface and having a planar periphery dimensionally corresponding to the periphery of the upper panel;
    means for sealing the periphery of the upper panel to the periphery of the lower panel to create a sealed envelope therebetween;
    a partial vacuum in the sealed envelope;
    constrictive force means for applying a compressive constrictive force to the periphery of at least the upper panel to compensate for tensile forces imposed on the panel by the partial vacuum in the sealed envelope, the tensile forces being known as the hoop tension and defined (a) for a right circular cylinder as $T=P_oR/t$, where T is the tension as measured in units of force per unit area; R is the radius of the circular section of the cylinder; t is the thickness for a thin-walled cylinder; and $P_o$ is the hydrostatic pressure differential across the surface of the cylinder, (b) for a spherical surface as $[T=P_oR(\text{Sin}^2\phi)/t]$, $T=P_oR/(2t)$ where $P_o$ is the difference in hydrostatic pressure across the sphere; R is the radius of the sphere; and t is the thickness of the thin spherical surface, and (c) for two concentric, right cylindrical surfaces and two concentric, spherical surfaces as $4R_1^2-W_1^2=4R_2^2-W_2^2$ where $R_1$ is the radius of the inner cylindrical surface; $W_1$ is the length of the chord for the inner cylindrical surface; $R_2$ is the radius of the outer cylindrical surface and $W_2$ is the chord of the outer cylindrical surface; and
    a solar energy absorber panel supported between the upper panel and the lower panel.

2. A solar collector comprising:
    an upper panel fabricated as a curvilinear surface from a transparent material;
    a lower panel dimensionally corresponding along its periphery to the upper panel;
    a solar heat absorbing panel comprising a fluid flow channel in combination with a layer of solar energy absorbing material, the solar heat absorbing panel being enveloped by the upper and lower panels;
    means for sealing the periphery of the upper and lower panels to form a sealed enclosure about the solar heat absorbing panel;
    a partial vacuum in the sealed enclosure to insulate the solar heat absorbing panel from conductive and convective heat losses; and
    constrictive force means for applying a constrictive force to the periphery of the upper and lower panels to compensate for tensile force stresses imposed on the transparent panels by the partial vacuum in the sealed enclosure, the tensile forces being known as the hoop tension and defined (a) for a right circular cylinder as $T=P_oR/t$, where T is the tension as measured in units of force per unit area; R is the radius of the circular section of the cylinder; t is the thickness for a thin-walled cylinder; and $P_o$ is the hydrostatic pressure differential across the surface of the cylinder, (b) for a spherical surface as $[T=P_oR(\text{Sin}^2\phi)/t]$, $T=P_oR/(2t)$ where $P_o$ is the difference in hydrostatic pressure across the sphere; R is the radius of the sphere; and t is the thickness of the thin spherical surface, and (c) for two concentric, right cylindrical surfaces and two concentric, spherical surfaces as $4R_1^2-W_1^2=4R_2^2-W_2^2$ where $R_1$ is the radius of the inner cylindrical surface; $W_1$ is the length of the chord for the inner cylindrical surface; $R_2$ is the radius of the outer cylindrical surface and $W_2$ is the chord of the outer cylindrical surface.

3. A solar collector as defined in claim 2 wherein the means for sealing the enclosure and the constrictive force means for applying a constrictive force are combined in the same structure comprising a framework for encompassing the sealed enclosure at the junction of the upper and lower panels, the framework including means for receiving a sealant material and constrictive force means for imposing a constrictive force on the framework.

4. A solar collector comprising in combination:
an envelope formed between an upper panel and a lower panel, at least the upper panel being fabricated from a transparent material and having a planar first periphery of predetermined configurations and dimensions, the upper panel including an upwardly directed curvilinear surface, the lower panel having a periphery corresponding to the periphery of the upper panel, the upper panel being sealed along its periphery to the periphery of the lower panel;
a solar energy absorber panel positioned in the envelope and spaced from the upper panel and the lower panel;
a partial vacuum in the envelope; and
constrictive force means for imposing a constrictive force to the periphery of at least the upper panel so as to compensate for tensile forces imposed on the periphery of the upper panel by the pressure differential between the partial vacuum and the surrounding ambient, the tensile forces being known as the hoop tension and defined (a) for a right circular cylinder as $T = P_o R/t$, where T is the tension as measured in units of force per unit area; R is the radius of the circular section of the cylinder; t is the thickness for a thin-walled cylinder; and $P_o$ is the hydrostatic pressure differential across the surface of the cylinder, (b) for a spherical surface as $[T = P_o R(\sin^2\phi)t]$, $T = P_o R/(2T)$ where $P_o$ is the difference in hydrostatic pressure across the sphere; R is the radius of the sphere; and t is the thickness of the thin spherical surface, and (c) for two concentric, right cylindrical surfaces and two concentric, spherical surfaces as $4R_1^2 - W_1^2 = 4R_2^2 - W_2^2$ where $R_1$ is the radius of the inner cylindrical surface; $W_1$ is the length of the chord for the inner cylindrical surface; $R_2$ is the radius of the outer cylindrical surface and $W_2$ is the chord of the outer cylindrical surface.

5. A solar collector as defined in claim 4 wherein the upper panel has a circular periphery and the curvilinear surface of the panel is a spherical curvature.

6. The solar collector defined in claim 1 wherein the inside surface of the envelope is coated with a reflective surface operable to reflect infrared radiation.

7. A solar collector as defined in claim 1 wherein the seal comprises at least one strip of resilient, air-impervious material placed adjacent the periphery of the upper panel and the periphery of the lower panel so as to provide a seal for the panels.

8. The collector defined in claim 1 wherein the constrictive force means for imposing a constrictive force comprises a framework means operable to be adjustably tightened about the periphery of the solar collector.

9. A solar collector as defined in claim 4 wherein the means for imposing a constrictive force comprises the lower panel wherein the lower panel includes an upwardly extending curvilinear surface and an upwardly directed flange around the periphery of the lower panel, the flange dimensionally corresponding to the periphery of the upper panel so as to receive the upper panel in nesting relationship, the partial vacuum in the envelope causing the pressure of the surrounding ambient to press against the lower panel and cause the periphery of the lower panel to constrict inwardly to impart a constrictive force to the periphery of the upper panel.

10. The solar collector defined in claim 1 wherein said constrictive force means for imposing a constrictive force comprises a framework means operable to be adjustably tightened about the periphery of the solar collector, said framework means comprising a support collar adapted to receive the peripheries of the upper and lower panels in sealing relationship and an upper compression band opposite the upper periphery and a lower compression band opposite the lower periphery, the upper compression band and the lower compression band cooperating in the support collar to impose a constrictive force about the upper periphery and the lower periphery.

11. The solar collector defined in claim 10 wherein the framework means comprises a grid and said support collar, the grid being adapted to be engaged by the support collar and placed under tension to thereby pull the support collar inwardly to place said periphery under a constrictive force.

* * * * *